B. BORDEN.
TAPER THREAD CUTTING TOOL.
APPLICATION FILED OCT. 23, 1907.
1,102,713.
Patented July 7, 1914.
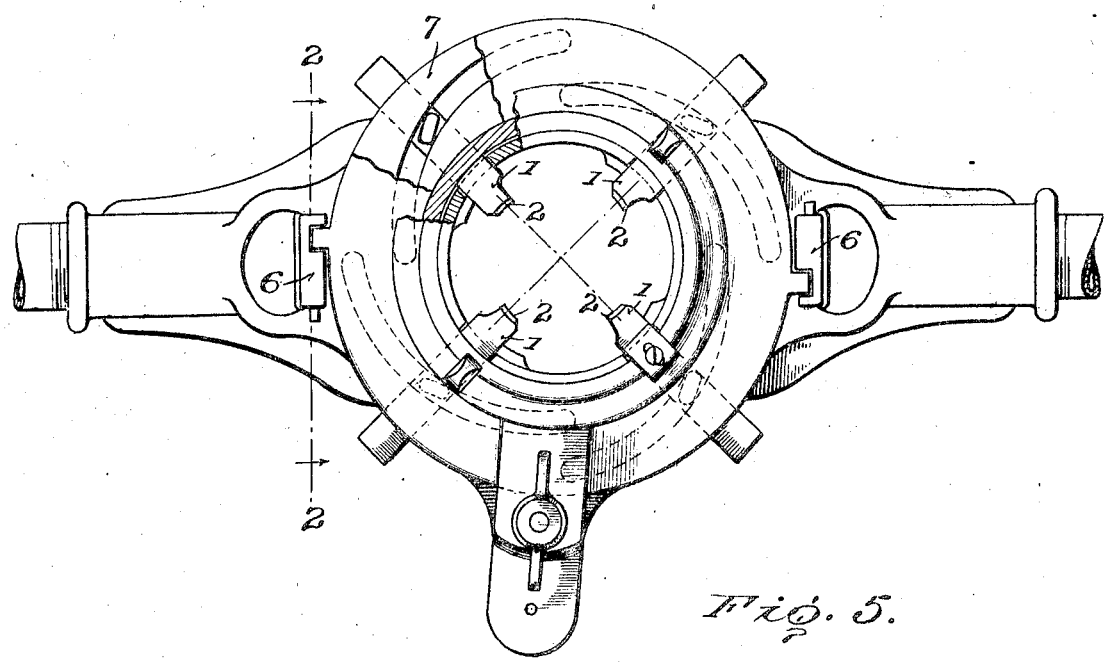
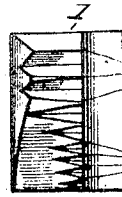
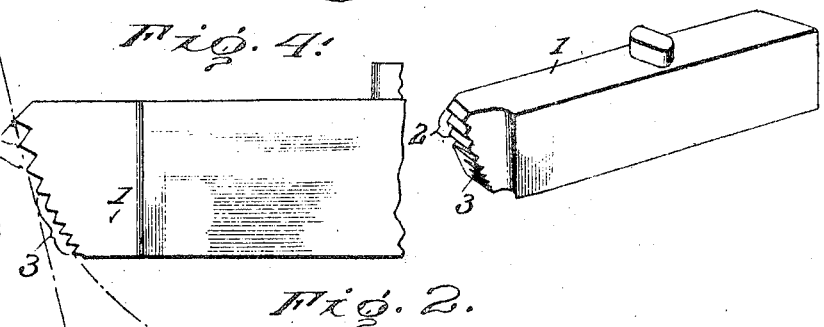
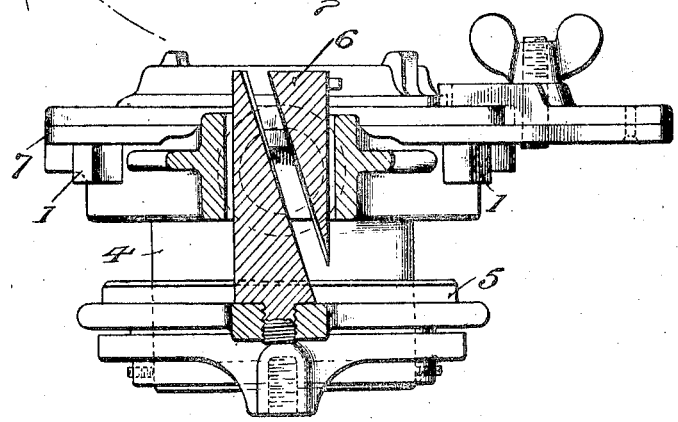
Witnesses
W. A. Williams
Francis S. Maguire
Inventor
Bradford Borden
By
Attorney

UNITED STATES PATENT OFFICE.

BRADFORD BORDEN, OF WARREN, OHIO, ASSIGNOR, BY MESNE ASSIGNMENTS, TO THE HART MANUFACTURING COMPANY, OF CLEVELAND, OHIO, A CORPORATION OF OHIO.

TAPER-THREAD-CUTTING TOOL.

1,102,713.        Specification of Letters Patent.        Patented July 7, 1914.

Application filed October 23, 1907. Serial No. 398,819.

*To all whom it may concern:*

Be it known that I, BRADFORD BORDEN, of Warren, in the county of Trumbull and State of Ohio, have invented certain new and useful Improvements in Taper-Thread-Cutting Tools; and I do hereby declare the following to be a full, clear, and exact description of the invention, such as will enable others skilled in the art to which it appertains to make and use the same.

The primary object of this invention is to dispense with the use of leader screws in that class of pipe threading tools wherein a taper thread is cut by the gradual recession of the chasers.

Heretofore it has been necessary in tools of this class to employ leader screws to initiate the cutting of the chaser teeth into the pipe, or other object to be threaded, and cause the stock to gradually travel toward the work holder. The use of leader screws is attended with no little annoyance; the presence of chips, grit, and other foreign substances greatly interfering with the operation and frequently causing serious injury to the thread, necessitating the substitution of a new leader. Furthermore, when the engagement of the chasers with the pipe is dependent upon the leader screw working in the thread of the work holder, there is a constant friction exerted on the leader screw which necessarily shortens the life of the tool, or at least of the leader screw and its cooperating thread in the work holder. Then again, it has been necessary heretofore to reverse the direction of rotation of the stock to back it off from the work, and the chasers in traversing the thread on the pipe are subjected to considerable wear by contacting with chips etc., which fall into the pipe thread.

I am enabled to dispense with the use of leader screws, in taper thread cutting tools, by forming the chasers with short, shallow threads which initiate a screwing engagement between the chasers and the pipe. The short, shallow threads are of gradually increased lengths, that is, the length of each of these threads is greater than that of the thread which precedes it in acting on the pipe so as to thereby easily and gradually bring about the engagement between the cutting threads of the chasers and the pipe. Once this engagement is started the cutting threads follow and continue the hold on the pipe, causing the stock to travel over the latter and toward the work holder solely by the engagement between the cutting threads of the chasers and the pipe. Preferably the initially acting threads are finer than the cutting threads, but this is immaterial. It is essential, however, that the initially-acting threads be short and shallow or mutilated, so to speak, that is, that they be so formed as to be incapable of acting on the pipe to any greater extent than to bring about the engagement between the cutting threads and the pipe. For this purpose a line connecting the points of the short threads lies at an angle to the axis of the tool greater than a line connecting the points of the cutting threads. By dispensing with the leader screw the capacity of the tool is greatly augmented. Since the pitch of the thread to be cut depends solely upon the pitch of the cutting threads of the chasers, different sets of chasers may be used interchangeably. Furthermore, the tool may be employed for cutting both left and right hand threads, by substituting the proper chasers. For this reason the chasers are set on center.

The invention will be hereinafter fully set forth and particularly pointed out in the claims.

In the accompanying drawings, Figure 1 is a plan view of a threading tool in connection with which my improvements are employed. Fig. 2 is a side view, partly in section. Fig. 3 is an enlarged end view, and Fig. 4 an enlarged side view of one of the chasers. Fig. 5 is a view in perspective.

Each of the chasers 1 is formed in its cutting face with the usual cutting threads 2, which are tapered, as customary. Preferably I employ three cutting threads, but this is not material, the number being largely controlled by the pitch of the thread to be cut. The cutting face of each chaser, from a point adjacent the innermost cutting thread 2, is cut-away or rounded on the arc of a circle, as shown in Fig. 3, and in this rounded portion I form a series of short, shallow threads 3, of graduated lengths each thread extending a distance less than the full width of the face of a chaser. That is to say, these threads at one end terminate flush with the face of a chaser, and are so ground-off or rounded that they present blunt edges, so to speak. Each thread is slightly longer than the thread which precedes it in engaging the pipe to be threaded. They have the necessary spiral formation to insure the proper coöperative work. In starting up the threading operation, these short shallow threads take into the metal of the pipe just sufficient to bring the cutting threads 2 of the several chasers into operative cutting engagement with such pipe. Once this is accomplished, the initially acting threads 3 have no office to perform, the cutting threads 2 alone controlling the travel of the stock. In consequence, the tubular sleeve 4 has a perfectly smooth exterior and may be moved longitudinally relative to the work holder 5 by a sliding movement. Heretofore this tubular sleeve has been exteriorly threaded so as to work in a corresponding female thread within the work holder, and constituted the lead screw.

The chasers recede as the cutting operation progresses so that a taper thread is cut on the pipe. The means shown in the drawings for effecting the gradual outward movement of the chasers corresponds generally with that shown in my Patent No. 862,876, and need not be here described beyond stating that the guide posts 6, which are mounted on the work holder and are rotated by the turning of the stock, effect the axial turning of plate 7 with which the several chasers engage.

The advantages of my invention will be apparent. It will be seen that the cost and annoyance of the leading screw are avoided; that the range of the tool is increased, being limited only by the differences in the pitch of the several sets of chasers; and that the manipulation of the tool is greatly facilitated by reason of the fact that the stock may be quickly returned to its starting point. Furthermore, the friction which exists in a stock employing a leader screw is entirely avoided, since there is no pull in opposition to that exerted by the chasers on the object being threaded.

In order that one tool may be used to cut both right and left hand threads, by merely changing the chasers, the slots for the latter are exactly on center, as shown in Fig. 1.

I claim as my invention:

1. As an article of manufacture, a chaser die for a screw-cutting device, said die being formed with a cutting face having a main portion of one taper and another portion, constituting the throat of the die, of another and more abrupt taper, a series of regular cutting threads being cut on such other and more abrupt taper, a series of short, shallow threads for initially gripping the stock being cut on such more abruptly tapered portion of the die-face.

2. As an article of manufacture, a chaser die for a screw-cutting device, said die being formed with a cutting face having a main portion of one taper and another portion, constituting the throat of the die, of another and more abrupt taper, a series of regular cutting threads being cut on such main portion of the die-face and a series of short, shallow threads for initially gripping the stock being cut on such more abruptly tapered portion of the die-face, such last-named threads being of graduated lengths.

3. As an article of manufacture, a chaser die for a screw-cutting device, said die being formed with a cutting face having a main portion of one taper and another portion, constituting the throat of the die, of another and more abrupt taper, a series of regular cutting threads being cut on such main portion of the die-face and a series of short, shallow threads for initially gripping the stock being cut on such more abruptly tapered portion of the die-face, such last-named threads being of graduated lengths and each such thread extending a distance less than the full width of the die-face.

4. As an article of manufacture, a chaser die for a screw-cutting device, said die being formed with a cutting face having a main portion of one taper and another portion, constituting the throat of the die, rounded off on another and more abrupt taper, a series of regular cutting threads being cut on such main portion of the die-face and a series of short, shallow threads for initially gripping the stock being cut on such rounded portion of the die-face.

5. As an article of manufacture, a chaser die for a screw-cutting device, said die being formed with a cutting face having a main portion of one taper and another portion, constituting the throat of the die, rounded off on the arc of a circle so as to be of another and more abrupt taper, a series of regular cutting threads being cut on such main portion of the die-face and a series of short, shallow threads for initially gripping the stock being cut on such rounded portion of the die-face.

6. In a screw-cutting device, the combination with chaser dies, each formed with a single cutting face having a main portion of one taper and another portion, constituting the throat of the die, of another and more abrupt taper, a series of regular cutting threads being cut on such main portion of the die-face and a series of threads for initially gripping the stock being cut on such more abruptly tapered portion of the die-face; of a member movably supporting said dies; and means adapted positively to retract said dies during the cutting operation, the length of the more abruptly tapered portion of the respective die-faces being so correlated with the rate of retraction of said dies that the threads on such portion, after serving to initially grip the stock, are relieved from forming the threads on the stock and the burden of this operation thrown on the threads on the less abrupt portion of the die-face.

7. In a screw-cutting device, the combination with chaser dies, each formed with a single cutting face having a main portion of one taper and another portion, constituting the throat of the die, rounded off on the arc of a circle so as to be of another and more abrupt taper, a series of regular cutting threads being cut on such main portion of the die-face and a series of short, shallow threads for initially gripping the stock being cut on such rounded portion of the die-face; of a member movably supporting said dies; and means adapted positively to retract said dies during the cutting operation, the length of the more abruptly tapered portion of the respective die-faces being so correlated with the rate of retraction of said dies that the threads of such portion, after serving to initially grip the stock, are relieved from forming the threads on the stock and the burden of this operation thrown on the threads on the less abrupt portion of the die-face.

8. In a taper thread cutting tool, in combination, a work holder, a stock having a smooth tubular portion movable in said work holder, a series of chasers mounted in said stock, and means for causing the chasers to recede as the cutting operation progresses, such chasers having each a series of regular cutting threads and a series of short shallow threads of graduated lengths for initiating the engagement between the chasers and the object to be threaded, a line connecting the points of the short threads lying at an angle to the axis of the tool greater than a line connecting the points of the cutting threads.

In testimony whereof, I have signed this specification in the presence of two subscribing witnesses.

BRADFORD BORDEN.

Witnesses:
FRANCIS S. MAGUIRE,
JOHN A. MURPHY.